United States Patent [19]

Lautenschlaeger

[11] Patent Number: 4,594,250

[45] Date of Patent: Jun. 10, 1986

[54] EXTRACTION OF FRUIT, VEGETABLE AND MEAT PRODUCTS WITH A POLYETHER-BASED POLYMER

[75] Inventor: Friedrich K. Lautenschlaeger, Mississauga, Canada

[73] Assignee: Canadian Patents and Development Limited, Ottawa, Canada

[21] Appl. No.: 652,428

[22] Filed: Sep. 20, 1984

Related U.S. Application Data

[63] Continuation of Ser. No. 441,784, Nov. 15, 1982, abandoned.

[30] Foreign Application Priority Data

Nov. 21, 1981 [GB] United Kingdom ............... 8135154

[51] Int. Cl.$^4$ .................... C12H 1/04; A23L 1/27; A23L 2/30; A23B 7/00
[52] U.S. Cl. .................... 426/257; 426/268; 426/330.3; 426/330.4; 426/330.5; 426/422; 426/486
[58] Field of Search ............... 426/330.4, 330.3, 330.5, 426/257, 268, 324, 486, 422, 424; 521/25, 27, 905

[56] References Cited

U.S. PATENT DOCUMENTS

| | | | |
|---|---|---|---|
| 3,053,664 | 9/1962 | Hall | 426/422 |
| 3,711,293 | 1/1973 | Geiger et al. | 426/422 |
| 4,008,339 | 2/1977 | Matsuda et al. | 426/330.4 |

FOREIGN PATENT DOCUMENTS

| | | | |
|---|---|---|---|
| 975733 | 11/1964 | United Kingdom | 426/422 |
| 1163426 | 9/1969 | United Kingdom | 426/422 |
| 1305375 | 1/1973 | United Kingdom | 426/422 |
| 1437902 | 6/1976 | United Kingdom | 426/422 |

*Primary Examiner*—Thomas G. Wiseman
*Assistant Examiner*—Elizabeth C. Weimar
*Attorney, Agent, or Firm*—Stevens, Davis, Miller & Mosher

[57] ABSTRACT

Fruit, vegetable and meat products and their derivatives are exposed in liquid and/or gaseous form to a polyether-based polymer to extract ingredients therefrom. The products and derivatives may be for human consumption or may be in the effluent of a food-processing plant. A preferred embodiment is the treatment of grape juice and wine derived from labruscan grapes to extract unwanted color and flavor components.

26 Claims, No Drawings

EXTRACTION OF FRUIT, VEGETABLE AND MEAT PRODUCTS WITH A POLYETHER-BASED POLYMER

This is a continuation of application Ser. No. 441,784, filed Nov. 15, 1982, now abandoned.

This invention relates to the treatment of fruit, vegetable and meat products to extract ingredients therefrom.

It is known that certain ingredients can be extracted from liquids and gases by certain materials such as ion-exchange resins, activated carbon and polyurethane foams. In our U.K. Patent Specification No. 1,305,375 we have described the use of polyurethane foams to extract various molecules having a dipole moment from aqueous solutions and gases. Experience has shown that it is not possible to predict whether a material which is known to extract a particular ingredient from a particular liquid or gas would be capable of or suitable for extracting the same or a different ingredient from a different liquid or gas, especially when selective extraction is desired from a complex system. Moreover when treating substances for animal, especially human, consumption, for instance to make them less toxic, tastier, more stable or more aesthetically pleasing, or to extract flavour, odour or colour components for use in other consumable substances, great care is necessary in the selection of the treatment agent and other treatment conditions to avoid imparting toxicity and other harmful or undesirable properties.

According to the present invention, a method of treating a substance being a fruit, vegetable or meat product or a derivative thereof comprises exposing the substance in liquid and/or gaseous form to a polyether-based polymer to extract one or more ingredients from the substance.

The present invention is particularly suitable for extracting ingredients from substances to make them more stable and/or to make them more desirable or acceptable for animal, especially human, consumption.

It is suitable also for the extraction of ingredients for subsequent use in other products, especially consumable products, for example to impart or fortify properties such as flavour, colour and/or odour.

A further application of the present invention is in the treatment of effluents from food-processing plants to salvage ingredients, for example colour and/or flavour components, and/or to make the effluents more suitable for disposal by, for example, extracting unpleasant odours.

Examples of substances which may be treated in accordance with the invention are fruit juices such as apple and grape juices, vegetable juices such as red cabbage juice, meat broths, milk whey; and fermented and distilled products such as wine, beer, cider and spirits. The juices may be the direct product of liquidising or extracting the liquid of a fruit or vegetable or they may be substances derived from the direct product such as by dilution, concentration, fermentation, adulteration, blending or other alteration.

Some of the chemicals which may be extracted by the method of the present invention are higher alcohols, particularly those having three or more carbon atoms, such as fusel oil (i.e. butyl alcohol, iso-amyl alcohol and higher homologues) and phenyl ethanol, esters such as ethyl acetate, methyl anthranilate, isoamyl acetate, ethyl caproate, ethyl caprylate, ethyl caprate and phenylethyl acetate, organic acids, especially volatile organic acids such as acetic acid and sorbic acid, sulphidic compounds such as free sulphur, sulphur dioxide and complex sulphides, and biogenic amines such as putrescine. Stability against mould-growth may be improved by removal or neutralisation of mould spores, for example wild yeast spores in grape juice. Pesticide residues may be extracted from fruit and vegetable juices, and fusel oil may be extracted from fermented and distilled alcoholic beverages.

A particularly preferred embodiment of the invention is in the treatment of wine or the grape juice precursor of wine.

Some grapes are known to impart flavour and/or colour and/or odour characteristics to a wine which affect undesirably the taste and/or appearance and/or smell of the wine. For instance, some grapes grown in France produce an undesirable raspberry flavour and some grapes grown in Canada and North-Eastern U.S.A. produce an undesirable degree of "foxy" flavour, a bluish tint and a stability of which improvement is desirable. Most of the grapes grown in Canada and Northern-Eastern U.S.A. are derived from the native Vitis Labrusca Bailey or Vitis Labrusca Lineus. Hybrids with European grape varieties are now grown; these hybrids are known as Labruscan grapes. Examples of these cultivars include those known as "Concord", "Catawba", "Ives Seedling", "Niagara", "Isabelle", "Golden Muscat", "Ontario" and "Delaware". All of these have the characteristic "labruscan" or "foxy" flavour, too much of which is considered to be undesirable. It is believed that this flavour is at least partly a result of the presence of methyl anthranilate. The flavour is also effected by sulphidic compounds, terpenes and sesquiterpenes, which are present in grape juice, and by sulphidic compounds and fusel oil which are produced by fermentation. Undesirable thiols can be removed relatively easily owing to their high reactivity but more complex sulphides have been difficult to extract, yet it is important to control the content of complex sulphides because very low concentrations of them have a great effect on flavour.

Also, certain anthocyanin colour components of labruscan red wine, especially the delphinidin derivative, are a cause of instability in the wine and therefore partial decolourisation is often advantageous. Moreover, it is often considered to be desirable to remove the blue tint, which results from delphinidin compounds in labruscan grapes, to produce a ruby wine of appearance which is more acceptable in the market place.

It is found that treatment with a polyester-based polymer in accordance with the present invention results in selective removal or modification of undesirable colour and/or flavour components of grape juice and wine, especially the objectionable "foxy" flavour and blue tint associated with labruscan grapes.

The treatment of wine may be performed prior to bottling and/or it may take place in the bottle by means of a polyether-based polymer attached to the inside of the bottle.

If desired the treatment may be employed to convert a red wine to a rosé or white wine.

In general, the substance as exposed to the polyether-based polymer may be in the form of a liquid, especially an aqueous solution, or in the form of a gas. The present invention is particularly suitable for extracting ingredients from dilute solutions and for extracting trace ingredients. The extraction may be complete or partial.

The polyether-based polymer is a polymer containing organo-ether units and suitably it is water-insoluble. Preferably, the polymer contains a significant proportion of alkylene oxide units, especially units of the general formula:

$$-(\!(C(R_1)(R_2))_{\overline{n}} O - C(R_3)(R_4) - C(R_5)(R_6) -$$

where n is zero or an integer and $R_1$ to $R_6$ are the same or different and are selected from alkyl groups, aryl groups and hydrogen atoms, and further that when n is more than 1 the $R_1$ radicals may be the same or different and the $R_2$ radicals may be the same or different. When all of the R radicals are identical alkyl groups, preferably the maximum number of carbon atoms in each group is 4. If some of the R radicals are hydrogen atoms, the other R radicals may include alkyl groups having more than 4 carbon atoms, the suitable maximum number of carbon atoms increasing as the proportion of R radicals that are hydrogen atoms increases. A particularly suitable polymer is one wherein $R_1$ to $R_6$ are each a hydrogen atom. Poly(methylene oxide) and poly(phenylene oxide) are not suitable for wine treatment.

The polymer may be a homopolymer or it may be a reaction product or copolymer (random, alternating, block or graft) containing a significant proportion of organo-ether units. The copolymer may contain only organo-ether units or it may contain organo-ether units and other units.

Preferred polymers are those containing alkylene oxide units having from 2 to 4 carbon atoms. An example of a suitable homopolymer is poly(tetramethylene oxide) and an example of a suitable all-ether copolymer is one containing ethylene oxide and tetramethylene oxide units. Usually the polyethers will have one or two hydroxyl end-groups. Examples of suitable block copolymers are A-B and A-B-A block copolymers in which A and B are different and are selected from blocks of poly(ethylene oxide), poly(propylene oxide) and poly(tetramethylene oxide). Alternatively, A or B may be a non-polyether block. A suitable copolymer comprising non-ether units is one having amide units, particularly units of the general formula:

$$-\overset{|}{\underset{|}{C}}-N(R)-C(O)-\overset{|}{\underset{|}{C}}-$$

where R is a hydrogen atom or an alkyl group. Block copolymers having a block or blocks of a polyamide and a block or blocks of a poly(alkylene oxide), for example poly(tetramethylene oxide), poly(propylene oxide) or poly(ethylene oxide) are suitable. An example of a suitable graft copolymer is one having a backbone of a non-ether such a nylon and graft chains of a poly(alkylene oxide) such as poly(ethylene oxide). An example of a suitable reaction product is a cross-linked polyether such as one made by reaction of the polyether and an organic polyepoxide such as a diepoxide. Some crosslinking or other modification such as polyamide blocking in the polyether-based polymer may be desirable to confer water-insolubility. Polyetherurethanes may be used but generally are not preferred owing to the risk of contamination of food products for consumption. Similarly polyetherureas are not preferred. If desired, the polymer may have side-chains and/or pendant groups to influence the extraction properties.

Polymers employed to treat substances for animal consumption obviously should be free of harmful ingredients which might be transferred to the substance during the treatment, for instance residual metal catalysts, especially tin catalyst residues from polyurethane production, amines and isocyanates. Polymers may also be selected to have desirable properties such as resistance to fungal and hydrolytic attack, e.g. a poly(tetramethylene oxide).

If desired, the polymer may contain an inorganic ionic ingredient, e.g. ammonium nitrate or lithium chloride, to impact ionic strength for inorganic ion extractions. Special additives known to have extraction properties, such as bentonite, ion-exchange materials and activated carbon, usually are not necessary but may be present if desired. If such a special additive is present, its presence may be in a minor proportion, the effect of the polyether-based polymer being preponderant.

The choice of polymer may depend on its polarity in relation to the ingredient(s) to be extracted. Low polarity polymers may be employed to extract hydrocarbons such as terpenes, and higher polarity polymers may be employed to extract alcohols and other polar compounds. Two or more polymers of different polarity may be employed to treat a single substance, for example the polymers may be aligned in order of polarity in a container through which the substance flows.

The polymer may be a solid or a liquid. Liquid polymers may be stabilised by adsorption on a support which is preferably inert and may be inorganic, e.g. silica, or organic, e.g. cellulose. Solid polymers include rigid, resilient and waxy forms. A large surface area is usually preferred to afford adequate surface contact with the substance to be treated. It may be in non-cellular or cellular form and a preferred form is a sponge (i.e. an open-celled foam), especially a high density sponge having good flow-through characteristics. A typical sponge density is in the range 10 to 50 kg.m$^{-3}$, although a sponge having a higher density may be employed, suitably with application of pressure to force the liquid or gas through the sponge pores. The polymer may be employed as a single piece or as several pieces, for example discs, fibres, slabs, sheets or particles e.g. open-celled microspheres or powder produced by cryogenic grinding. If desired, the polymer may be employed in the form of a flow-through membrane. The polymer may be in a container for the substance.

The amount of polymer employed in a treatment obviously depends on the type of polymer and the ingredients to be extracted. An amount of polyetherurethane foam of as little as 0.5% by weight has been shown to remove the blue tint from a labruscan wine and usually an amount of no more than 5% by weight is sufficient to remove sufficiently the unwanted "foxy" flavour and blue tint from such wines.

Similarly, other treatment conditions such as time, temperature and pressure may be chosen with practice depending on the polymer and the ingredients to be extracted. A few minutes or a few hours may be sufficient. Room temperature (e.g. 10°-25° C.) and atmospheric pressure are usually adequate but lower or higher temperatures and pressures may be preferred in some circumstances.

When the polymer is employed in sponge form it may be cleared of entrained gases and residues prior to the treatment by, for example, flushing with an inert gas such as helium or nitrogen and/or squeezing and releasing the sponge (when sufficiently resilient) in the presence of a solvent such as hot water, steam or ethanol.

Also, when the polymer is employed as a resilient sponge, it may be squeezed and released in contact with the substance to be treated to remove gas from the pores at the start of the treatment so as to enable maximum surface contact with the substance. Moreover, the sponge may be squeezed and released several times during the treatment to facilitate circulation of the substance through the sponge.

The treatment may be discontinuous such as by treating a fixed quantity of the substance with the polymer in a closed container, or it may be continuous such as by causing the substance to flow over the polymer, e.g. in a tubular container with an inlet for the substance at one end and an outlet for the treated substance at the other end. The substance may be pumped from a reservoir upwardly through a column of the polymer and, if necessary, re-circulated back into the reservoir and again through the column.

The mechanism by which ingredients are extracted in accordance with the present invention is believed to be an adsorption and/or absorption mechanism. Extracted ingredients usually can be recovered from the polymer by treatment with one or more suitable solvents for the ingredients, for example hot water, steam, ethanol, acidified (e.g. $H_2SO_4$ or $CH_3COOH$) ethanol or dilute acid, and the recovered ingredients may then be employed in other processes.

The invention is illustrated in the following Examples.

EXAMPLE I

Treatment of Red Wine with Polyether 20 g of a poly(tetramethylene oxide) diol available as "Teracol 2000" ex. Du Pont was deposited on 20 g of silica type HiSil 233. A free-flowing powder was obtained. In three experiments, 2.0, 1.0 and 0.5 g of this powder were added to 58 ml of red wine ("Andre's Celler Cask") in a capped flask. After shaking for 15 hours at ambient temperature (ca. 20° C.), partial decolourisation, including removal of the blue tint, was observed in all samples.

Partial decolourisation was also obvious even with 0.25% (weight/weight) of "Teracol 2000".

EXAMPLE II

Treatment of Red Wine with Polyether 1 g of a poly(tetramethylene oxide) diol available as "POLYMEG" ex. Quaker Oats Co., U.S.A., having a molecular weight of 1020, a hydroxyl number of 109.5 and an acid number of 0.020, was added to 20 ml of red wine in a 125-ml Erlenmeyer flask with mechanical stirring. The waxy polymer turned purple within 2 minutes, and continued to darken on standing at room temperature (ca. 20° C.). Within 30 minutes, the wine, which originally had a bluish tint, turned ruby red.

EXAMPLE III

Treatment of Red Wine with Polyether Copolymer

To 5 ml of red wine (Andre's "Concord") in a 200-ml screw-capped flask was added 0.025 g (about 0.5%) of extruded 0.5 mm strings of a polyamide/poly(ethylene oxide) block copolymer available under the trade name "Pebax" 4011 RNOO from ATO, U.S.A.

After 90 hours at ambient temperature (ca 20° C.) the wine was found to be essentially decolourised and the polymer had turned dark purple. Also the undesirable "labruscan" flavour of the wine was found to be removed essentially.

The above procedure was repeated using extruded strings of the following commercially available polyamide/poly(alkylene oxide) copolymers in place of the "Pebax" 4011.

"Grilon" PLY 1240, available from Grilon U.K. Ltd., U.K.
"Grilon" PLY 1256, available from Grilon U.K. Ltd., U.K.
"Vestamid" 3978, available from Hüls, Germany.
"Vestamid", 4005, available from Hüls, Germany.
"Vestamid" 4062, available from Hüls, Germany.
"Vestamid" 4089, available from Hüls, Germany.
"Vestamid" 4138, available from Hüls, Germany.
"Pebax" 2533, available from ATO, U.S.A.
"Pebax" 4033, avauable from ATO, U.S.A.
"Pebax" 5533, available from ATO, U.S.A.

In each case a reduction in the colour and essential removal of the "labruscan" flavour of the wine resulted.

EXAMPLE IV

Treatment of Red Wine with NCO-Capped Polyether

A 0.1 g cube of a hydrophilic isocyanate-end-capped poly(ethylene oxide) sponge available as "Hypol" from W. R. Grace Co., Lexington, MA, U.S.A., was added to 15 ml of red wine and then given a single squeeze. Partial decolourisation occurred over a period of two days at ambient temperature (ca. 20° C.) and the sponge itself turned dark brown.

Partial decolourisation was also obvious even with 0.07% (weight/weight) of "Hypol" sponge.

EXAMPLE V

Treatment of Red Wine with Polyetherurethane 6 discs of a commercially available poly(propylene oxide)-based polyurethane sponge, each measuring about 12.6 cm in diameter and about 3.8 cm in thickness, and having a total weight of 61.3 g, were purified in boiling water for 1 hour and then dried at 50° C., under a reduced pressure of 10 mm Hg. The discs were then placed in a 3-liter flask and the air in the flask and sponge was replaced by nitrogen. To this was added 1560 ml of red wine (Bright's) and the sponge was compressed to be completely immersed and then mechanically squeezed at 10-minute intervals at ambient temperature (ca. 20° C.). After 40 minutes the liquid was decanted and the sponge was squeezed to remove excess liquid. An amount of 1460 ml was collected.

Analysis of the treated wine by combined gas chromatography and mass spectroscopy gave the following results:

|  | Control | Treated |
|---|---|---|
| Total volatile ester content (ppm) | 204 | 183 |
| Methyl anthranilate (ppm) | 0.80 | 0.24 |

EXAMPLE VI

Treatment of Red Wine with Polyetherurethane 4.5 g of approximately 0.1-g pieces of the polyurethane sponge defined in Example V were prepared by boiling in water, washing with distilled water and drying in a nitrogen atmosphere. To the sponge in a 200-ml screw-capped flask were added 150 ml of red wine ("Marie Christina", of Jordan Wines, Canada). The sponge was squeezed to wet it completely and the mixture was allowed to stand for 24 hours at ambient temperature (ca 20° C.).

After filtration in a nitrogen atmosphere, the wine was analyzed for putrescine, one of the biogenic amines. The analysis result was:
Control: 4.06 ppm.
Treated: 0.65 ppm.

EXAMPLE VII

Comparison of Polymers

Several polymer powders were compared with regard to their effect on the colour and the flavour of wine. 5 g of polymer pellets (pellet weight=approximately 10 mg) and 20 ml of medium dry red wine in a test-tube were maintained at ambient temperature (ca 20° C.) for 24 hours.

A comparison of colour and flavour removal showed the following results:

| Type of polymer | Colour Removed | Effect on Labruscan Flavour |
| --- | --- | --- |
| 1. Poly(propylene oxide)-based polyurethane sponge (commercial grade.) | Dark purple | Largely removed |
| 2. Polynorbornene (Norsorex) | None | (a) |
| 3. Poly(phenylene oxide) | None | Unchanged |
| 4. Nylon 11 | Trace | " |
| 5. Sulphonated polyethylene (Surlyn A) | None | " |
| 6. Polycarbonate (Lexan) | None | " |
| 7. Poly(phenyl sulphone) | None | " |
| 8. Polyacrylate (Plexiglas) | None | " |
| 9. Polystyrene (Styron 683) | None | " |
| 10. Bakelite phenoxy resin | None | " |
| 11. Poly (methylene oxide)(Delrin) | None | " |
| 12. Poly(ethylene sulphide) | Blue (b) | (a) |
| 13. Poly(vinyl butyral) (Butvar | Purple | (a) |
| 14. ABS (Luran) | None | (a) |
| 15. ABS (Terluran) | None | (a) |
| 16. Polyacetal (Celcon) | None | Unchanged |
| 17. Poly(vinylchloride) (Geon) | Purple (b) | " |
| 18. Bentonite Clay | Purple (b) | " |
| 19. Polythioetherurethane (Caytor) | None | (a) |
| 20. Poly(tetramethylene ether)-based polyurethane | Dark Blue | Partially removed |

(a) the material introduces an odour of its own
(b) weak colour absorption

EXAMPLE VIII

Treatment of Ale with Polyetherurethane

To 350 ml of Canadian commercial bottle ale in a 500-ml Erlenmeyer vessel were added 10 g of 5-10 cm³ cubes of the polyurethane sponge defined in Example V. Some frothing occurred. The sponge was squeezed initially and at 10-minute intervals for 30 minutes at 20° C., after which time the flavour of the liquid had changed noticeably. After standing for a further 2½ hours without squeezing of the sponge, the liquid was decanted and the sponge was squeezed to remove most of the liquid.

The flavour composition of the treated liquid and an untreated control was determined as follows. Nitrogen was bubbled through the liquid and the vapours were collected by passing the gas over a silica adsorption medium. The silica was then extracted with pentane, the pentane was partially evaporated and then analyzed by gas-liquid chromatography, flame photometric detection and flame ionisation detection.

The flame photometric detection showed that the treatment decreased the dimethyl disulphide content from 0.56 μg/l to 0.39 μg/l, and the dimethyl trisulphide content from 0.62 to 0.44 μg/l.

The flame ionisation detection showed more than 20 flavour components, all of which have been identified. The treatment caused almost a complete removal of iso-amyl alcohol, iso-amyl acetate, ethyl caproate, ethyl caprylate, ethyl caprate, phenylethyl acetate and phenyl ethanol.

The gas-filled chromatographic analysis showed that several volatile components were not removed, which indicates a degree of selectivity, and also that the flavour loss is not due to the general exposure of the beverage.

EXAMPLE IX

Treatment of Red Cabbage Extract wuth NCO-Capped Polyether 20 ml of an aqueous red cabbage extract were treated with 2 g of the sponge defined in Example IV.

The cabbage extract decolourised and the sponge turned blue. The colour could not be removed with ethanol, but with acetic acid the sponge and the acid turned red immediately. This suggested that the colour can be adsorbed both in the natural and acid state, although less so in the latter case.

On standing for two weeks, an unextracted control sample became mouldy, whereas no mould growth was found on the treated sample.

The extracted colour could be used as a colourant for edible substances.

EXAMPLE X

Treatment of Apple Juice with Polyetherurethane

Into a 200-ml jar were added 150 ml of apple juice and 2.396 g of the polyurethane sponge cubes defined in Example V. The sponge was squeezed occasionally and removed after 4.5 hours at ambient temperature (ca. 20° C.).

After washing with distilled water and air-drying, the weight of the sponge had increased by 25 mg and the juice had turned pale yellow.

The material extracted by the sponge had the characteristic apple flavour and could be used to impart flavour to other substances.

The treated juice had a greater resistance to mould growth.

EXAMPLE XI

Treatment of Grape Juice with Polyetherurethane

A quantity of the polyurethane sponge cubes defined in Example V was pre-extracted by boiling in water for 60 minutes, washing with water and allowing to dry in air to constant weight. 26.35 g of the pre-extracted sponge cubes were added to 500 ml of grape juice (commercial sample, supplied by Cadbury, Schweppes, Powel Inc.) in a 32-ounce jar and the sealed jar was kept at about 5° C. for 5 days. The juice was then squeezed from the sponge and compared with an untreated sample in standard laboratory evaluations.

The results show a decrease in colour, acid and aroma.

|  | Control Sample | Treated Sample |
|---|---|---|
| Solids (% w/w) | 14.5 ° Bx | 14.3 ° Bx |
| Acid (% w/w; as Tartaric) | 0.82 | 0.75 |
| Colour (absorption at 520 nm) | 0.68 | 0.28 |
| Aroma | Typical "Concord" | Very little aroma |
| Flavour | Typical "Concord" | Very little "Concord" flavour; slightly sweet |

EXAMPLE XII

Treatment of Milk Whey with Polyetherurethane 6 g of a poly(ethylene oxide)-based polyurethane sponge available as "Hypol" 2002 from W. R. Grace Co., in the form of a 6-mm thick disc, were added to 100 ml of milk whey obtained from a commercial dairy, in a lidded 4-ounce jar. The sponge was squeezed in contact with the whey initially and was then left to stand in contact with it.

Within 24 hours, both the characteristic odour and taste of the whey had been extracted.

EXAMPLE XIII

Treatment of Food Processing Gaseous Effluent with Polyetherurethane

Into a metal cartridge (25-cm length, 4-cm diameter) were placed 17.5 g of the polyurethane sponge defined in Example V which had been mechanically torn into irregular shapes of a maximum length approximately 1 cm. A quantity of 50 liters of stack gas from a pet food processing plant was passed through the sponge at a rate of 5.2 l/min.

An odour panel noted a significant reduction in odour, estimated to be a reduction of about 30%.

Having now described my invention, what I claim is:

1. A method of treating a substance being a fruit, vegetable or meat product, or a derivative thereof, to extract one or more ingredients therefrom, comprising exposing the substance in liquid and/or gaseous form to an extractive effective amount of a substance consisting essentially of a polyether-based polymer selected from:
   (i) organo-ether homopolymers containing alkylene oxide units of the general formula

where n is zero or an integer and $R_1$ to $R_6$ are the same or different and are selected from alkyl groups, aryl groups and hydrogen atoms, and further that when n is more than 1 the $R_1$ radicals may be the same or different and the $R_2$ radicals may be the same or different; and
   (ii) organo-ether copolymers and reaction products containing a preponderance of alkylene oxide units having the above general formula, not being polyetherurethanes or polyetherureas.

2. A method according to claim 1 wherein the substance comprises grape juice or wine.

3. A method according to claim 2 wherein the grape juice or wine is derived from labruscan grapes.

4. A method according to claim 3 wherein the polymer removes or reduces the blue tint and/or the "foxy" flavour of the grape juice or wine.

5. A method according to claim 3 wherein the polymer removes or reduces the methyl anthranilate content of the grape juice or wine.

6. A method according to claim 3 wherein the polymer removes or reduces a delphinidin compound content of the grape juice or wine.

7. A method according to claim 1 wherein the polymer selected is an organo-ether homopolymer containing alkylene oxide units of the general formula:

where n is zero or an integer and $R_1$ to $R_6$ are the same or different and are selected from alkyl groups, aryl groups and hydrogen atoms, and further that when n is more than 1 the $R_1$ radicals may be the same or different and the $R_2$ radicals may be the same or different.

8. A method according to claim 7 wherein each of the $R_1$ to $R_6$ radicals is a hydrogen atom.

9. A method according to claim 1 wherein the polymer is one containing alkylene oxide units having from 2 to 4 carbon atoms.

10. A method according to claim 1 wherein the polymer is a polyether homopolymer.

11. A method according to claim 10 wherein the polymer is poly(tetramethylene oxide).

12. A method according to claim 1 wherein the polymer is a polyether copolymer.

13. A method according to claim 1 wherein the copolymer contains ethylene oxide and tetramethylene oxide units.

14. A method according to claim 1 wherein the copolymer comprises organo-ether units and amide units of the general formula:

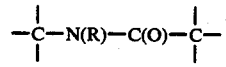

where R is a hydrogen atom or an alkyl group.

15. A method according to claim 1 wherein the copolymer is selected from the group consisting of a A-B or A-B-A block copolymer in which A or B is a polyether block and the other block or blocks is a non-polyether block.

16. A method according to claim 15 wherein the non-polyether block is a polyamide block.

17. A method according to claim 16 wherein the polyether block is selected from poly(tetramethylene oxide), poly(propylene oxide) and poly(ethylene oxide) blocks.

18. A method according to claim 1 wherein the polymer is a graft copolymer having organo-ether graft chains on a dissimilar back-bone.

19. A method according to claim 18 wherein the graft copolymer has a back-bone of nylon and graft chains of a poly(alkylene oxide).

20. A method according to claim 1 wherein the polymer is a reaction product of a polyether and an organic polyepoxide.

21. A method according to claim 10 wherein the polymer has one or two hydroxyl end-groups.

22. A method according to claim 1 wherein the polymer is a solid.

23. A method according to claim 1 wherein the polymer is employed in the form of several pieces.

24. A method according to claim 1 wherein the polymer is a liquid adsorbed onto a solid support.

25. A method according to claim 1 wherein the amount of polymer employed is not more than 5% by weight of said substance.

26. A method of treating a food or beverage being a fruit, vegetable or meat product to remove undesired substances, comprising contacting the food or beverage with an extractive effective amount of a substance consisting essentially of a water-insoluble polyether-based polymer selected from the group consisting of:
(a) polytetramethylene oxide;
(b) a polyether copolymer containing tetramethylene oxide units and other alkylene oxide units;
(c) a polyether copolymer comprising organo-ether units and amide units of the general formula:

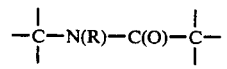

wherein R is a hydrogen atom or an alkyl group; and
(d) a reaction product of a polyether and an organic polyepoxide.